United States Patent [19]

Martyniuk

[11] 4,453,843
[45] Jun. 12, 1984

[54] TROT-LINE REEL

[76] Inventor: Andrew Martyniuk, 11 E. Jacquelin Dr., Bensenville, Ill. 60106

[21] Appl. No.: 404,396

[22] Filed: Aug. 2, 1982

[51] Int. Cl.³ ............................................. A01K 97/00
[52] U.S. Cl. ..................................................... 43/57.3
[58] Field of Search ...................... 43/57.2, 57.3, 54.1,
43/25.2, 27.4, 20, 21, 18.1; 441/7, 8, 9, 10;
242/84.1 J, 84.1 L, 84.1 M, 104, 84.1 R

[56] References Cited

U.S. PATENT DOCUMENTS

| | | | |
|---|---|---|---|
| 335,826 | 2/1886 | Martin | 242/104 |
| 1,490,370 | 4/1924 | Figley | 43/57.2 |
| 2,041,322 | 5/1936 | Cantini | 43/57.3 X |
| 2,130,112 | 9/1938 | Woolen | 43/57.1 |
| 2,531,816 | 11/1950 | Homoky | 242/100 |
| 2,857,706 | 10/1958 | Skains | 43/27.4 |
| 3,775,893 | 12/1973 | McGee, Jr. | 43/57.3 |
| 3,818,625 | 6/1974 | Shults | 43/57.3 X |
| 4,091,559 | 5/1978 | Easley | 43/57.3 |

FOREIGN PATENT DOCUMENTS 57415 10/1922 Sweden .

Primary Examiner—Nicholas P. Godici
Assistant Examiner—P. Weston Musselman, Jr.
Attorney, Agent, or Firm—Burmeister, York, Palmatier, Hamby & Jones

[57] ABSTRACT

The disclosed trot-line reel is used for reeling and unreeling a trot-line having a multiplicity of leaders secured thereto at spaced intervals therealong, with fish hooks at the ends of the leaders. The reel comprises a cylindrical shaft with a spool mounted thereon and having first and second end flanges. The shaft has first and second end portions projecting from the spool beyond the corresponding end flanges. The first end flange has an edge portion with a multiplicity of slots therein for receiving the leaders of the trot-line. Numerous rubber bands are anchored around the first end portion of the shaft for receiving the hooks of the trot-line with the rubber bands stretched to maintain the leaders under tension to prevent tangling of the leaders and the hooks. A split ring, such as a key ring, may be retained around the end of the shaft to anchor the rubber bands. The split ring makes it easy to add new rubber bands, when needed to replace broken bands. To receive the split ring, the shaft may have an end cap or other element with an annular shoulder against which the ring is retained. The second end portion of the shaft provides a handle and also may be inserted into an oarlock socket on a boat. The spool may have a cylindrical body with a plurality of outwardly projecting longitudinal ridges for causing portions of the trot-line to be spaced away from the body, so as to facilitate the drying of the trot-line.

14 Claims, 17 Drawing Figures

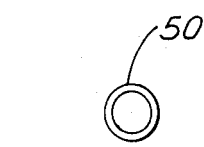
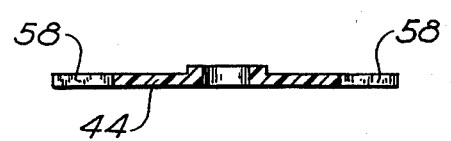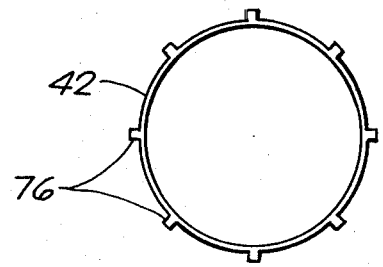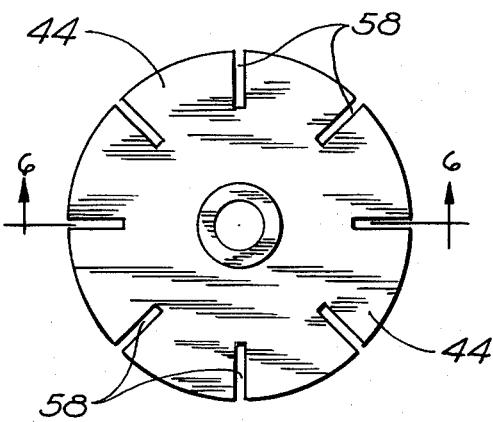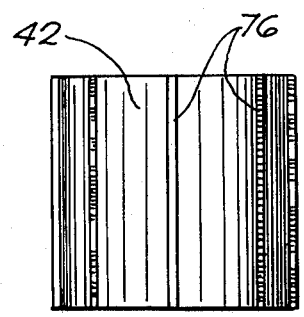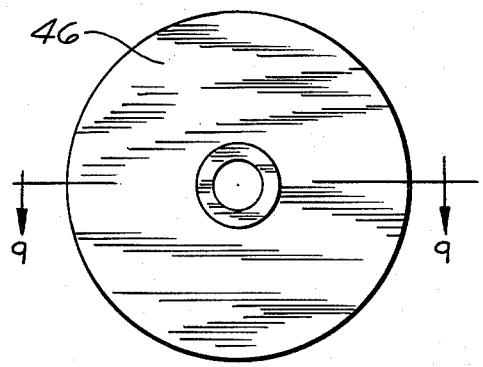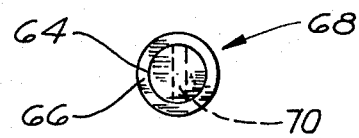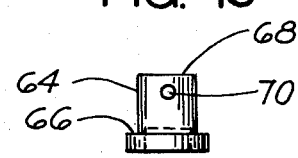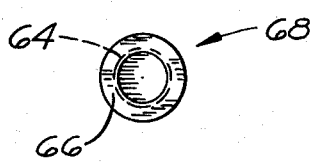

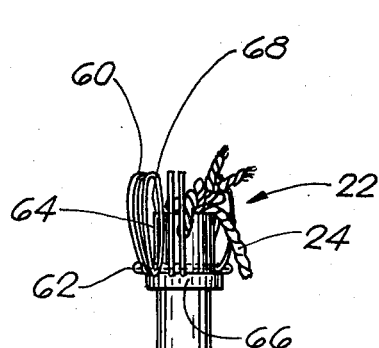
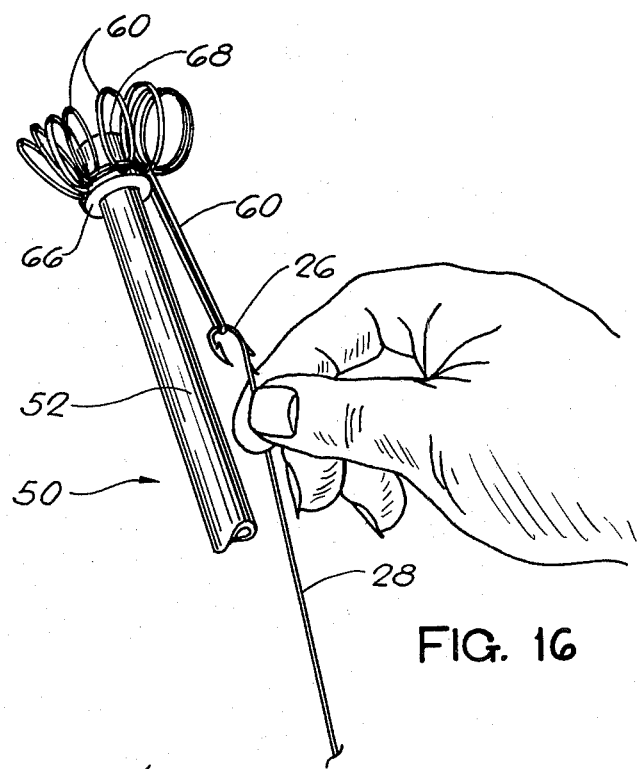
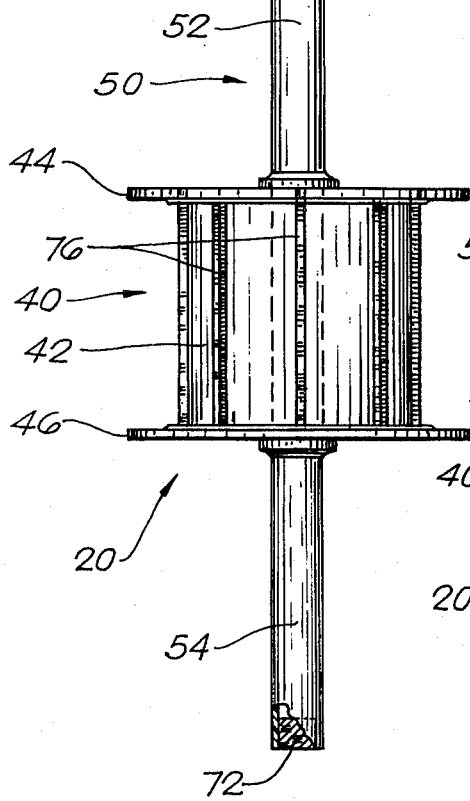
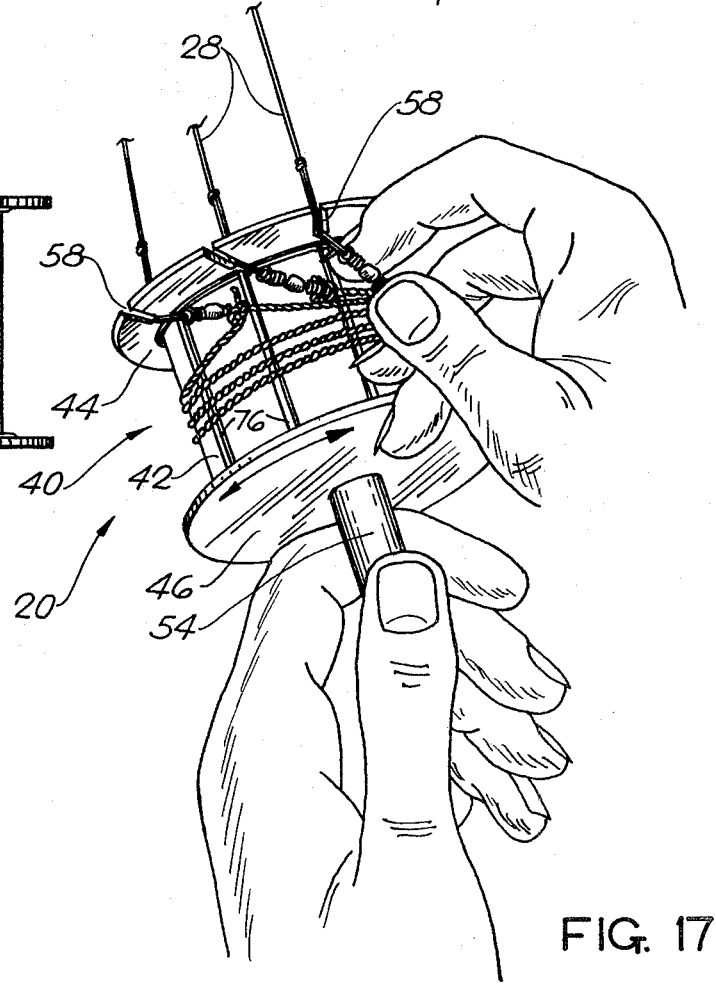
FIG. 15
FIG. 16
FIG. 17

TROT-LINE REEL

FIELD OF THE INVENTION

This invention relates to a trot-line reel for reeling and unreeling a trot-line having a multiplicity of leaders secured thereto at spaced intervals along the line, with fish hooks at the ends of the leaders.

BACKGROUND OF THE INVENTION

Trot-lines have long been used in fishing to provide a line having a multiplicity of hooks spaced along the line. All of the hooks may be baited and the line may be submerged in a stream, lake or other body of water to increase the chances of catching a multiplicity of fish. The ends of the line may be connected to anchors or to shoreline objects such as trees. From time to time, the trot-line may be pulled out of the water to remove fish which have been caught and to rebait the hooks.

Trot-lines are difficult to handle, to store and to reel with conventional reeling equipment, because the hooks and the leaders tend to become tangled with each other and with the main line. Sometimes a trot-line becomes so badly tangled that it is useless and has to be discarded.

OBJECTS OF THE INVENTION

One object of the present invention is to provide a new and improved trot-line reel for reeling and unreeling a trot-line, while preventing the leaders and the hooks from becoming tangled.

A further object is to provide a new and improved trot-line reel in which each of the hooks is safely tethered as the line is reeled, and each of the leaders is held under tension to prevent tangling.

SUMMARY OF THE INVENTION

To achieve these and other objects, the present invention may provide a trot-line reel for reeling and unreeling a trot-line having a multiplicity of leaders secured thereto at spaced intervals therealong with fish hooks at the ends of the leaders, such reel comprising a generally cylindrical shaft member, a spool mounted on the shaft member, such spool having first and second end flanges, the shaft member having first and second end portions projecting from the spool beyond the respective first and second end flanges, the first end flange having an edge portion with a multiplicity of slots therein for receiving the leaders of the trot-line, a multiplicity of elastic bands, and anchoring means for anchoring the elastic bands to the first end portion of the shaft member at points spaced around the shaft member with the elastic bands dangling from the shaft member for receiving the hooks of the trot-line with the elastic bands stretched to maintain the leaders under tension to prevent tangling of the leaders and the hooks.

The elastic bands preferably take the form of rubber bands. The anchoring means may comprise a ring on which the elastic bands are strung, such ring being retained around the first end portion of the shaft member.

The ring may be a split ring, such as a closely coiled key ring, which makes it easy to add new or additional rubber bands to the ring, as needed.

The ring may be received around an end cap or other element on the shaft. The end element may have an annular shoulder facing away from the spool for retaining the ring in spaced relation to the spool.

The second end portion of the shaft member may serve as a handle or may be received in an oar-lock socket on a boat. Both the spool and the shaft member may be hollow so that the reel will float on the surface of a body of water, if desired. The hollow shaft member may be closed at both ends by end caps or the like.

The spool may have a cylindrical body with a plurality of longitudinal ridges projecting outwardly therefrom, for causing portions of the trot-line to be spaced away from the body of the spool, thereby facilitating the drying of the trot-line.

BRIEF DESCRIPTION OF THE DRAWINGS

Further objects, advantages and features of the present invention will appear from the following description, taken with the accompanying drawings, in which:

FIGS. 3-14 illustrate component parts of the trot-line reel.

More specifically, FIG. 3 is an elevational view of the cylindrical shaft for the reel.

FIG. 4 is an end view of the cylindrical shaft of FIG. 3.

FIG. 5 is a plan view of a slotted end flange for the spool of the reel.

FIG. 6 is a section taken generally along the line 6—6 in FIG. 5.

FIG. 7 is an edge view of the flange.

FIG. 8 is a plan view of a second end flange for the spool.

FIG. 9 is a section taken generally along the line 9—9 in FIG. 8.

FIG. 10 is an elevational view of the cylindrical body for the spool.

FIG. 11 is a plan view of the cylindrical body, with longitudinal ribs projecting outwardly therefrom.

FIG. 12 is an elevational view of an end cap, adapted to be mounted on the shaft for receiving the ring which anchors the rubber bands to the shaft.

FIG. 13 is a top plan view of the end cap of FIG. 12.

FIG. 14 is a bottom plan view of the end cap.

FIG. 15 is an elevational view of the trot-line reel with the trot-line removed from the reel.

FIG. 16 is a perspective view illustrating the manner in which each fish hook is hooked unto an individual rubber band to tether the hook and to tension the corresponding leader.

FIG. 17 is a perspective view showing the manner in which each leader is inserted into one of the slots on the first end flange of the spool.

DETAILED DESCRIPTION OF THE ILLUSTRATIVE EMBODIMENT

Figure 1:
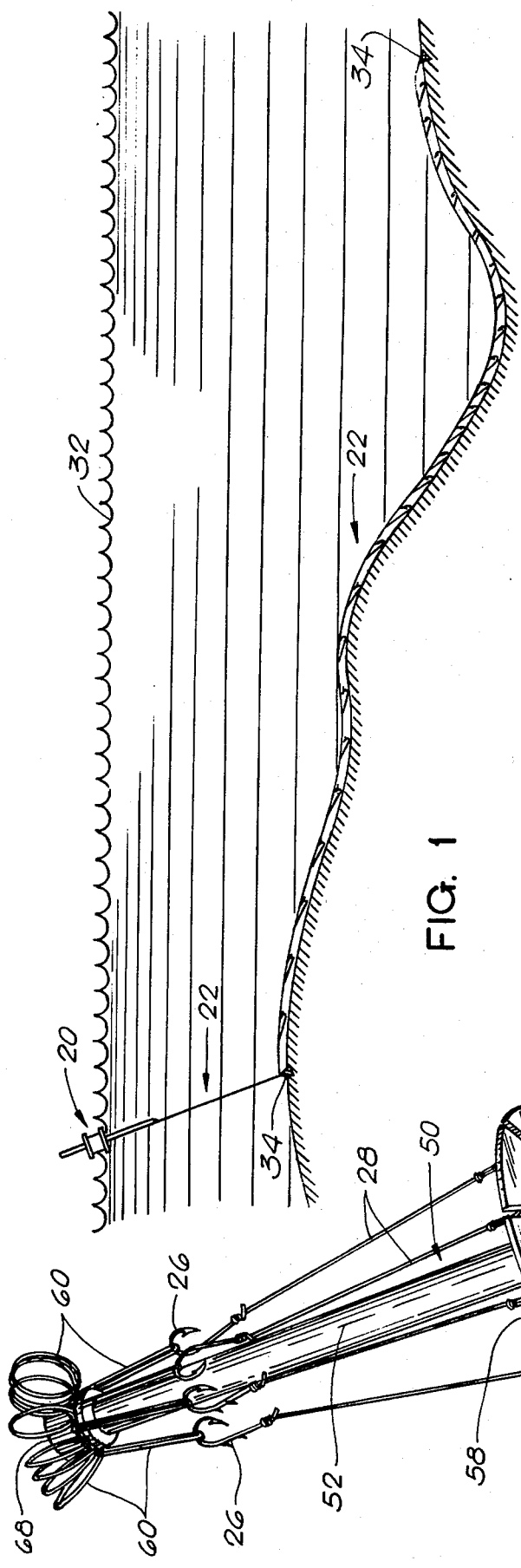
FIG. 1 is a vertical section, taken through a body of water, showing a trot-line submerged in the water and connected to a trot-line reel to be described as an illustrative embodiment of the present invention.

As just indicated, the drawings illustrate a trot-line reel 20 for reeling and unreeling a trot-line 22 having a main fishing line 24 to which a multiplicity of fishing hooks 26 are connected, preferably by means of individual leaders 28, connected to the line 24 at spaced points therealong. In this case, each leader 28 includes a swivel 30. The leaders 28 may be knotted or otherwise connected to the line 24. In use, the trot-line 22 may be extended and submerged under the water of a stream, lake or other body of water 32. Weights or anchors 34 may be connected to the trot-line 22, at or near its ends. Alternatively, either or both ends of the trot-line may be connected to objects on shore, such as trees or the like. As shown, the trot-line reel 20 is connected to one end of the trot-line 22 and is adapted to serve as a float or marker buoy, so that the end of the line can easily be located and reeled in.

The illustrated trot-line reel 20 comprises a spool 40 including a generally cylindrical body 42 having first and second end flanges 44 and 46. The spool 40 is adapted to receive the trot-line 22 when it is reeled in.

The spool 40 is mounted on or formed in one piece with a generally cylindrical shaft member 50 having first and second end members 52 and 54 extending axially from the corresponding ends of the spool 40. As shown, the first end member 52 is longer than the second end member 54. The second end member serves as a handle, and is also adapted to be rotatably received in an oar-lock socket or the like, on a boat, to provide rotatable support for the trot-line reel.

Figure 2:
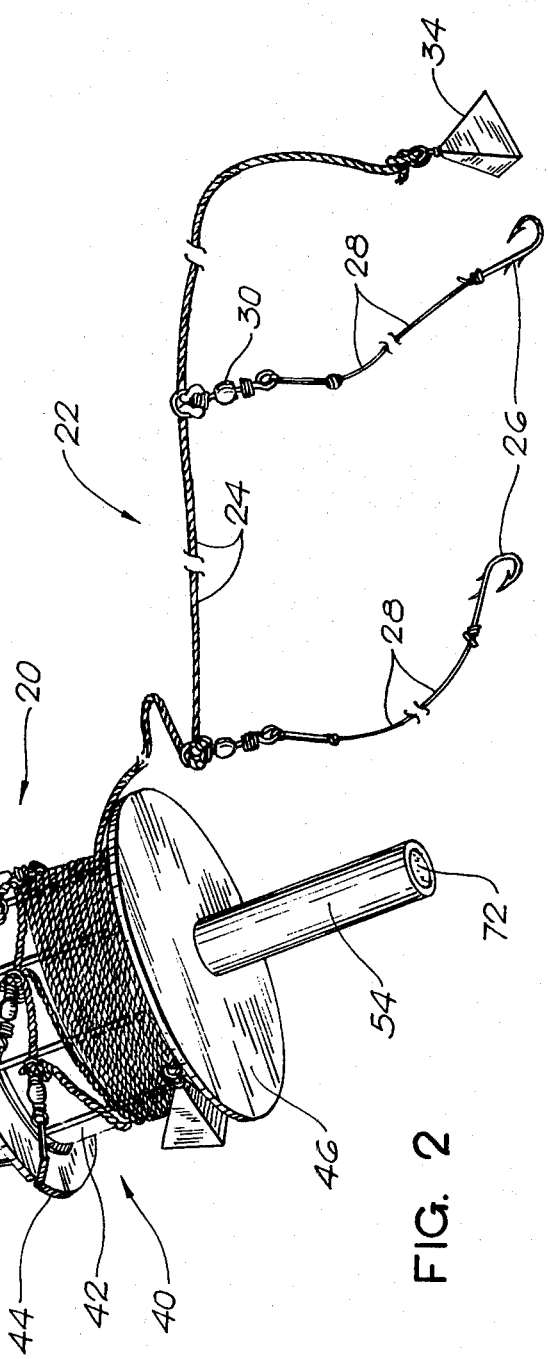
FIG. 2 is a perspective view showing the trot-line reel with a portion of the trot-line reeled thereon, another portion of the trot-line being unreeled from the reel.

As shown in FIGS. 2, 5 and 17, the edge portion of the first end flange 44 on the spool 40 is formed with several slots or notches 58, spaced at intervals around the end flange 44, for receiving the leaders 28 of the trot-line 22. Such slots are not required in the second end flange 46.

The fish hooks 26 are adapted to be received by a multiplicity of elastic bands 60, anchored or tethered to the first end member 52 of the shaft 50. The elastic bands 60 may be in the form of ordinary rubber bands. Each rubber band 60 is adapted to receive one of the hooks 26, as shown in FIGS. 2 and 16. Enough rubber bands 60 are provided to receive all of the hooks 26. The length of the leaders 28, the rubber bands 60 and the first shaft member 52 are proportioned so that each rubber band 60 must be stretched to reach the corresponding hook 26. Thus, the stretched rubber band keeps the corresponding leader 28 under tension at all times, to prevent tangling of the hooks 26 and the leaders 28.

The trot-line reel 20 includes means for anchoring or tethering the rubber bands 60 to the first shaft member 52, preferably near its end. As shown, such means may very advantageously take the form of a ring 62 through which the rubber bands 60 are strung. The ring 62 is slipped around a cylindrical end member 64 on the shaft member 52 and preferably is retained against a flange 66. The end member 64 and the flange 66 may be provided on an end cap 68, secured on the end of the shaft member 52. As shown, the end cap 68 is formed with a hole 70 through which the main fishing line 24 of the trot-line 22 may be tied.

To make it easy to string the rubber bands 60 on the ring 62, it is highly advantageous to provide such ring 62 in the form of a split ring, preferably a split key ring of the well known type made of closely coiled wire which is formed into a half-round cross section. By spreading the coils of the ring 62, the rubber bands 60 can easily be strung around the ring 62, in the same manner as keys would be mounted on the ring. The provision of the split ring 62 makes it easy to mount the rubber bands 60 on the ring originally, and also to add new rubber bands, as needed, to replace broken or weakened rubber bands. The ring 62 is slipped around the cylindrical end member 64 with the rubber bands 60 compressed between the ring and the cylindrical member 64 to provide a secure fit. However, it is easily possible to remove the ring 62 when it is necessary to add one or more rubber bands to the ring 62.

In use, one end of the main fishing line 24 of the trot-line 22 is preferably tied through the hole 70 in the end cap 68, which may be cemented or otherwise secured to the end of the first shaft member 52. When the trot-line 22 is unreeled, as shown in FIG. 1, the trot-line reel 20 may serve as a float or marker buoy. To afford buoyancy, the spool 40 and the shaft 50 may be made of lightweight materials, such as various plastics, and may be hollow. The end of the second shaft member 54 may be closed with a plug or cap 72. Instead of using the trot-line reel 20 as a float, the second shaft member 54 may be mounted in an oar-lock socket or the like on a boat.

When it is desired to reel in the trot-line 22, the second shaft member 54 may be held in one hand, as shown in FIG. 17. Alternatively, the second shaft member 54 may be rotatably mounted in a suitable socket, such as an oar-lock socket on a boat. The main fishing line 24 of the trot-line 22 is strung down from the end cap 68 and is inserted through one of the slots 58 in the end flange 44. The spool 40 is then turned to coil or reel the fishing line 24 on the cylindrical body 42 of the spool 40. It will be seen that the cylindrical body 42 is formed with several outwardly projecting longitudinal ridges 76 which cause portions of the trot-line 22 to be spaced away from the cylindrical body 42, so as to facilitate the drying of the line.

The main fishing line 24 is coiled around the spool 40 until the first leader 28 reaches the spool, whereupon such leader is inserted through the most convenient slot 58, while keeping the leader under tension. One of the rubber bands 60 is stretched, and the hook 26 on the leader 28 is inserted through such rubber band 60. The stretched rubber band 60 keeps the leader 28 under tension, so that the hook 26 is securely tethered to prevent any tangling of the hooks and the leaders.

The reeling process is continued, to bring each leader 28 in turn to the spool 40, whereupon each leader is inserted through one of the slots 58 in the flange 44, while maintaining the leader 28 under tension. The corresponding hook 26 is inserted through an individual rubber band 60, while stretching the rubber band to reach the hook 26. The stretched rubber bands 60 keep all of the hooks 26 securely tethered, while maintaining tension on the leaders 28, to prevent tangling of the hooks and the leaders.

In this way, the entire trot-line 22 may be easily reeled onto the trot-line reel 20. The free end of the main fishing line 24 may be loosely tied or otherwise loosely secured to the reel 20 to prevent the line from uncoiling.

When it is desired to unreel the trot-line 22, the process is reversed. The main fishing line 24 is uncoiled from the spool 40 until each leader 28 is reached. The corresponding hook 26 is then disconnected from its individual rubber band 60, and the leader 28 is removed from its individual slot 58 in the flange 44. The hooks 26 may be baited as the trot-line is unreeled.

If it becomes necessary to add rubber bands 60, the split key ring 62 is removed from the cylindrical end member 64, and the ring 62 is spread apart so that one or more rubber bands 60 may be slipped around the ring 62. The ring 62 is then slipped around the cylindrical end member 64 and against the flange 66.

Various modifications may be made within the spirit and scope of the appended claims. As shown in FIGS. 3-14, the trot-line reel is made of several individual components, cemented or otherwise secured together. The components may be made of suitable materials, such as various plastics. The shaft 50 is in the form of a hollow plastic tube, while the body 42 of the spool 40 is in the form of a hollow plastic cylinder.

However, the trot-line reel 20 may be formed in many other ways. For example, the spool 40 and the shaft members 52 and 54 may be molded in one piece from suitable plastic materials, including plastic foam materials. It is also feasible to mold the spool 40 and the shaft members 52 and 54 in the form of two or more major components which may be cemented, sealed or otherwise secured together. The major components may be hollow to provide buoyancy. While the split key ring 62 affords highly advantageous means for anchoring or tethering the elastic bands 60 on the shaft member 52, other means for anchoring or tethering the elastic bands 60 may be employed.

I claim:

1. A trot-line reel for reeling and unreeling a trot-line having a multiplicity of leaders secured thereto at spaced intervals and with fish hooks on the ends of the leaders, said trot-line reel comprising a generally cylindrical shaft member, a spool mounted on said shaft member, said spool having first and second radial end flanges for retaining the trot-line on said spool, said shaft member having first and second end portions projecting from said spool beyond said first and second end flanges, said first end flange having an edge portion with a multiplicity of slots formed therein for receiving the leaders of the trot-line, a multiplicity of elastic rubber bands and anchoring means for anchoring the rubber bands on said first end portion of said shaft member at a multiplicity of points around said end portion, said anchoring means comprising a split ring on which said rubber bands are strung, and an end element on said first end portion of said shaft member for receiving and retaining said ring with the anchored portions of the rubber bands extending between said ring and said end element and with the other portions of said rubber bands dangling for receiving the fish hooks with the rubber bands stretched to maintain the leaders under tension so as to prevent tangling of the leaders and the hooks, said end element having a shoulder facing away from said spool for retaining the ring in a spaced relation to said spool.

2. A trot-line reel according to claim 1, in which said end element is in the form of an end cap on said first end portion of said shaft member.

3. A trot-line reel according to claim 1, in which said ring is of a closely coiled split construction commonly used as a key ring, whereby the rubber bands are easily mountable on said ring.

4. A trot-line reel for reeling and unreeling a trot-line having a multiplicity of leaders secured thereto at spaced intervals therealong, with fish hooks at the ends of said leaders, said reel comprising a generally cylindrical shaft member, a spool mounted on said shaft member, said spool having first and second end flanges, said shaft member having first and second end portions projecting from said spool beyond said respective first and second end flanges, said first end flange having an edge portion with a multiplicity of slots therein for receiving the leaders of the trot-line, a multiplicity of elastic bands, and anchoring means for anchoring said elastic bands to said first end portion of said shaft member at points spaced around said shaft member with said elastic bands dangling from said shaft member for receiving the hooks of the trot-line with the elastic bands stretched to maintain the leaders under tension to prevent tangling of the leaders and the hooks, said anchoring means comprising a split ring on which said elastic bands are strung, said ring being retained around said first end portion of said shaft member, said split ring being of a closely coiled construction commonly used as a key ring.

5. A trot-line reel for reeling and unreeling a trot-line having a multiplicity of leaders secured thereto at spaced intervals therealong, with fish hooks at the ends of said leaders, said reel comprising a generally cylindrical shaft member, a spool mounted on said shaft member, said spool having first and second end flanges, said shaft member having first and second end portions projecting from said spool beyond said respective first and second end flanges, said first end flange having an edge portion with a multiplicity of slots therein for receiving the leaders of the trot-line, a multiplicity of elastic bands, and anchoring means for anchoring said elastic bands to said first end portion of said shaft member at points spaced around said shaft member with said elastic bands dangling from said shaft member for receiving the hooks of the trot-line with the elastic bands stretched to maintain the leaders under tension to prevent tangling of the leaders and the hooks, said anchoring means comprising a split ring on which said elastic bands are strung, said first end portion of said shaft member having an end element around which said split ring is retained, with said elastic bands between said ring and said end element, said end element having a shoulder facing away from said spool for retaining said ring in spaced relation to said spool.

6. A trot-line reel according to claim 5, in which said end element is in the form of an end cap on said first end portion of said shaft member.

7. A trot-line reel for reeling and unreeling a trot-line having a multiplicity of leaders secured thereto at spaced intervals therealong with fish hooks at the ends of said leaders, said reel comprising a spool on which the trot-line may be coiled, a shaft projecting axially from said spool, said spool having an end flange formed with a plurality of slots for receiving the leaders of the trot-line, and a multiplicity of elastic bands anchored to said shaft for receiving the hooks of the trot-line with said elastic bands stretched to maintain the leaders under tension to prevent tangling of the leaders and the hooks, said elastic bands being anchored by anchoring means comprising a split ring on which said elastic bands are strung, said split ring being of a closely coiled construction commonly used as a key ring.

8. A trot-line reel according to claim 7, in which said shaft includes a shoulder against which said ring is retained.

9. A trot-line reel according to claim 7, in which said elastic bands take the form of rubber bands.

10. A trot-line reel according to claim 7, in which said spool includes a generally cylindrical body having a plurality of outwardly projecting ridges extending longitudinally along the outside of said body for causing portions of the trot-line to be spaced away from said body and thereby facilitating the drying of the trot-line.

11. A trot-line reel according to claim 7, in which said shaft member takes the form of a generally cylindrical hollow tube having end elements closing both ends of said tube.

12. A trot-line reel according to claim 7, in which said shaft member is provided with a portion having a hole through which an end portion of the trot-line may be tied.

13. A trot-line reel according to claim 7, in which said second end portion of said shaft member constitutes a cylindrical handle and is rotatably receivable in an oar-lock socket or the like.

14. A trot-line reel for reeling and unreeling a trot-line having a multiplicity of leaders secured thereto at spaced intervals therealong with fish hooks at the ends of said leaders, said reel comprising a spool on which the trot-line may be coiled, a shaft projecting axially from said spool, said spool having an end flange formed with a plurality of slots for receiving the leaders of the trot-line, and a multiplicity of elastic bands anchored to said shaft for receiving the hooks of the trot-line with said elastic bands stretched to maintain the leaders under tension to prevent tangling of the leaders and the hooks, said elastic bands being anchored by anchoring means comprising a split ring on which said elastic bands are strung, said split ring being of a closely coiled construction, which may be spread to add new elastic bands to said ring.

* * * * *